(12) United States Patent
Hu et al.

(10) Patent No.: US 12,523,261 B2
(45) Date of Patent: Jan. 13, 2026

(54) DISCONNECT MODULE, POWER TRANSMISSION SYSTEM FOR VEHICLE, AND VEHICLE

(71) Applicant: VALEO EMBRAYAGES, Amiens (FR)

(72) Inventors: Xun Hu, Amiens (FR); Fei He, Amiens (FR); Lu Li, Amiens (FR); Chun Li, Amiens (FR); Lei Shi, Amiens (FR); Yefei Han, Amiens (FR)

(73) Assignee: VALEO EMBRAYAGES, Amiens (FR)

( * ) Notice: Subject to any disclaimer, the term of this patent is extended or adjusted under 35 U.S.C. 154(b) by 0 days.

(21) Appl. No.: 18/818,699

(22) Filed: Aug. 29, 2024

(65) Prior Publication Data
US 2025/0075747 A1 Mar. 6, 2025

(30) Foreign Application Priority Data
Sep. 1, 2023 (CN) .......................... 202311125341.7

(51) Int. Cl.
*F16D 11/10* (2006.01)
(52) U.S. Cl.
CPC ................................ *F16D 11/10* (2013.01)
(58) Field of Classification Search
CPC ............... F16D 11/10; F16D 2125/582; F16H 2055/178; F16H 3/05; F16H 3/083; F16H 2063/3096
See application file for complete search history.

(56) References Cited

U.S. PATENT DOCUMENTS

| 10,724,579 | B2 * | 7/2020 | Reichert | F16F 15/1201 |
| 11,739,838 | B2 * | 8/2023 | Silvestri | F16D 28/00 |
| | | | | 192/220.2 |
| 2018/0345785 | A1 * | 12/2018 | Beesley | F16D 11/04 |

(Continued)

FOREIGN PATENT DOCUMENTS

| CN | 112503108 A | 3/2021 |
| CN | 212803996 U | 3/2021 |
| CN | 113167338 A | 7/2021 |

(Continued)

*Primary Examiner* — Bobby Rushing, Jr.
(74) *Attorney, Agent, or Firm* — Oblon, McClelland, Maier & Neustadt, L.L.P.

(57) ABSTRACT

A disconnect module for engaging/disengaging a first component from a first shaft includes a clutch member rotatably mounted on the first shaft, a drive member axially arranged between the first component and the clutch member and connected to the first component. The clutch member can reciprocate axially to engage/disengage from the drive member. A reset assembly applies pressure to the clutch member towards a disengagement direction for disengaging from the drive member, and an actuator including an action end that can reciprocate axially. A pressing assembly configured to connect the action end with the clutch member, so under the pressure applied by the reset assembly, one reciprocating movement of the action end brings the clutch member from a disengaged state to an engaged state and maintains the engaged state until a next reciprocating movement of the action end brings the clutch member from the engaged state to the disengaged state.

20 Claims, 6 Drawing Sheets

(56) References Cited

U.S. PATENT DOCUMENTS

2020/0232520 A1   7/2020   Ozawa et al.

FOREIGN PATENT DOCUMENTS

| CN | 115853921 | A |   | 3/2023 | |
| CN | 220816339 | U |   | 4/2024 | |
| DE | 102019133670 | B3 | * | 5/2021 | ............ F16D 27/118 |
| WO | WO-2018086716 | A1 | * | 5/2018 | ............ F16D 27/118 |

* cited by examiner

DISCONNECT MODULE, POWER TRANSMISSION SYSTEM FOR VEHICLE, AND VEHICLE

FIELD OF THE INVENTION

The present disclosure relates to a disconnect module for engaging or disengaging a first component rotatable about a first shaft with or from the first shaft. The present disclosure further relates to a power transmission system for a vehicle, which comprises the disconnect module. In addition, the present invention also relates to a vehicle, which comprises the power transmission system.

BACKGROUND OF THE INVENTION

The trend of designing and manufacturing fuel-efficient and low-emission vehicles has greatly increased, which is inevitably caused by environmental concerns and increased fuel costs. The forefront of this trend is the development of electric vehicles, such as pure electric vehicles, hybrid vehicles, plug-in hybrid vehicles, extended-range electric vehicles, fuel cell vehicles, etc.

Four-wheel drive electric vehicles are equipped with motors at the front and rear, which are usually divided into main drive motors and auxiliary drive motors, wherein, in some cases, the auxiliary drive motors may be in a non-working state. For example, the auxiliary drive motors are used only during acceleration or special working conditions, or when a driver needs to obtain some high-performance modes. However, when an auxiliary drive motor stops running, the wheel will still drive the auxiliary drive differential to operate, and the differential will drive all transmission mechanisms and motors connected thereto to rotate together, thereby generating drag losses. To improve efficiency, a disconnect module is added to the power transmission system of the electric vehicle, thereby reducing drag losses.

A conventional disconnect module usually adopts a monostable mode. That is, to realize that the auxiliary drive motors are in a working state, the actuator of the disconnect module needs to remain energized so that the disconnect module is in an engaged state. Therefore, the engaged state is an unstable state, and once the actuator is powered off, the disconnect module cannot maintain the engaged state. This means that the electric vehicle must continue to supply power for the actuator while the auxiliary drive motors are in the working state. Such energy consumption is a waste.

SUMMARY OF THE INVENTION

The technical problem to be solved by the present disclosure is to overcome the above defects or shortcomings of the prior art, and the present disclosure provides a disconnect module, which can provide two stable states, namely a stable engaged state and a stable disengaged state, without consuming additional energy to maintain any state.

According to an aspect of the present disclosure, provision is made for a disconnect module for engaging or disengaging a first component rotatable about a first shaft with or from a first shaft, wherein the disconnect module comprises:
  a clutch member rotatably and fixedly mounted on the first shaft;
  a drive member axially arranged between the first component and the clutch member and fixedly connected to the first component, wherein the clutch member can reciprocate axially to engage with and disengage from the drive member, the first shaft rotates together with the first component in an engaged state, and the first shaft is independent of the first component in a disengaged state;
  a reset assembly for applying pressure to the clutch member towards a disengagement direction for disengaging from the drive member;
  an actuator comprising an action end that can reciprocate axially; and
  a pressing assembly configured to connect the action end with the clutch member, so that under the pressure applied by the reset assembly, one reciprocating movement of the action end can bring the clutch member from the disengaged state to the engaged state and maintain the engaged state until a next reciprocating movement of the action end brings the clutch member from the engaged state to the disengaged state.

In the present disclosure, the traditional clutch is split into two components, namely, the drive member and the clutch member, wherein the drive member is fixedly connected to the first component, the reset assembly is arranged on the side of the clutch member facing the drive member, and the actuator is arranged on the side of the clutch member away from the drive member. The reset assembly and the actuator cooperate with each other on two sides of the clutch member to provide the clutch member with a force to approach or move away from the drive member. Also, the pressing assembly is arranged between the clutch member and the actuator, so that the clutch member can be in a stable engaged state and a stable disengaged state. That is, it is not necessary to continuously energize the actuator to maintain any of the two states, thereby greatly reducing energy consumption and realizing a bistable disconnect module.

In an exemplary embodiment, the pressing assembly comprises:
  a pressure plate axially abutting against the clutch member and provided with N first protrusions;
  a driven plate for receiving an action force from the action end and provided with 2N second protrusions; and
  a guide member having a first support section radially supporting the driven plate, wherein 2N sliding grooves extending axially are provided in the first support section, the sliding grooves are configured to guide the second protrusions to slide axially, and comprise first sliding grooves and second slide grooves having a radial depth smaller than that of the first sliding grooves, and the first sliding grooves are arranged alternately with the second sliding grooves along a circumferential direction,
  wherein in the disengaged state, the first protrusions can enter the first sliding grooves to slide axially, and in the engaged state, the first protrusions can be stopped on the outside of the second sliding grooves.

In an exemplary embodiment, the first protrusions have first inclined surfaces inclined in the same direction relative to a radial plane, respectively, and the second protrusions have abutting ends for abutting against the first inclined surfaces, respectively; wherein in each reciprocating movement of the action end, when the first protrusions are pushed to the outside of the sliding grooves by the second protrusions, the first protrusions can drive the pressure plate to rotate relative to the driven plate by a certain angle each time under the action force of the action end and the pressure applied by the reset assembly; wherein the guide member is further provided with end inclined surfaces cooperating with the first inclined surfaces of the pressure plate, so that the first protrusions of the pressure plate can move towards the disengagement direction during each rotation, thereby alternately entering the first sliding grooves and being stopped on the outside of the second sliding grooves.

In an exemplary embodiment, the guide member is provided with partition portions located between the first sliding grooves and the second sliding grooves, and the end inclined surfaces comprise second inclined surfaces assigned to the partition portions and third inclined surfaces assigned to the second sliding grooves, wherein the third inclined surfaces are adjacent to the second inclined surfaces with a smooth transition.

In an exemplary embodiment, the partition portions comprise first partition portions located upstream of the second sliding grooves along a rotation direction of the pressure plate and second partition portions located downstream of the second sliding groove, and the second partition portions protrude axially from the third inclined surfaces of the second sliding grooves.

In an exemplary embodiment, the driven plate and/or the pressure plate are/is provided with a snap mechanism for preventing the driven plate from being axially separated from the pressure plate.

In an exemplary embodiment, the snap mechanism comprises a plurality of claws protruding from one of the driven plate and the pressure plate and capable of being snapped onto an edge of the other of the driven plate and the pressure plate.

In an exemplary embodiment, the edge is provided with an inclined groove extending obliquely to an axial direction, which is used to mount the claws and prevent the claws from being disengaged axially.

In an exemplary embodiment, the guide member is sleeved on the first shaft, and the driven plate and the pressure plate are separately sleeved on the guide member.

In an exemplary embodiment, the partition portions are protrusions.

In an exemplary embodiment, the guide member further has a second support section for rotationally and fixedly supporting the clutch member, and the second support section is axially spaced apart from the first support section.

In an exemplary embodiment, the guide member further has a third support section adjacent to the second support section, the disconnect module comprises a retaining ring provided on the third support section, and the retaining ring is arranged on a side of the drive member close to the first component and has an axial gap with the drive member.

In an exemplary embodiment, the reset assembly comprises:
 a spring acting axially; and
 an end surface bearing for axially supporting the spring so that the spring can also maintain acting axially when the clutch member is in the disengaged state.

In an exemplary embodiment, the reset assembly further comprises:
 a first support gasket for abutting against an end of the spring facing away from the clutch member; and
 a second support gasket for abutting against an end of the spring facing the clutch member,
 wherein the end surface bearing is axially supported between the second support gasket and the clutch member or axially supported between the first support gasket and the drive member or the first component.

In an exemplary embodiment, the second support gasket is provided with a protrusion stamped from one side, and the protrusion is used to support one end of the spring.

In an exemplary embodiment, the end surface bearing comprises a first support ring fixedly connected to the second support gasket and a second support ring fixedly connected to the clutch member.

In an exemplary embodiment, the first component is an idler gear in a speed reducer, and the drive member is fixedly connected to an end surface of the idler gear.

According to another aspect of the present invention, provision is made for a power transmission system for a vehicle, comprising: a motor having a drive shaft; a speed reducer having at least one transmission shaft; and the disconnect module described previously, wherein the first shaft comprises the drive shaft or the at least one transmission shaft.

According to another aspect of the present invention, provision is made for a vehicle, comprising the transmission system described previously.

With reference to the following description, these and other features, aspects and advantages of the present disclosure will become easier to understand. The accompanying drawings incorporated in this specification and constituting a part thereof illustrate embodiments of the present application, and are used to explain the principles of the present application together with the described description.

BRIEF DESCRIPTION OF THE DRAWINGS

The accompanying drawings are incorporated into and constitute a part of the specification. The accompanying drawings, together with the general description above, a detailed description of exemplary embodiments and methods given below, are used to explain the principles of the present invention. The objects and advantages of the present invention will become apparent when studying the following description according to the accompanying drawings, in which the same elements are given the same or similar reference signs, and in which.

IN THE FIGURES

Figure 1A:
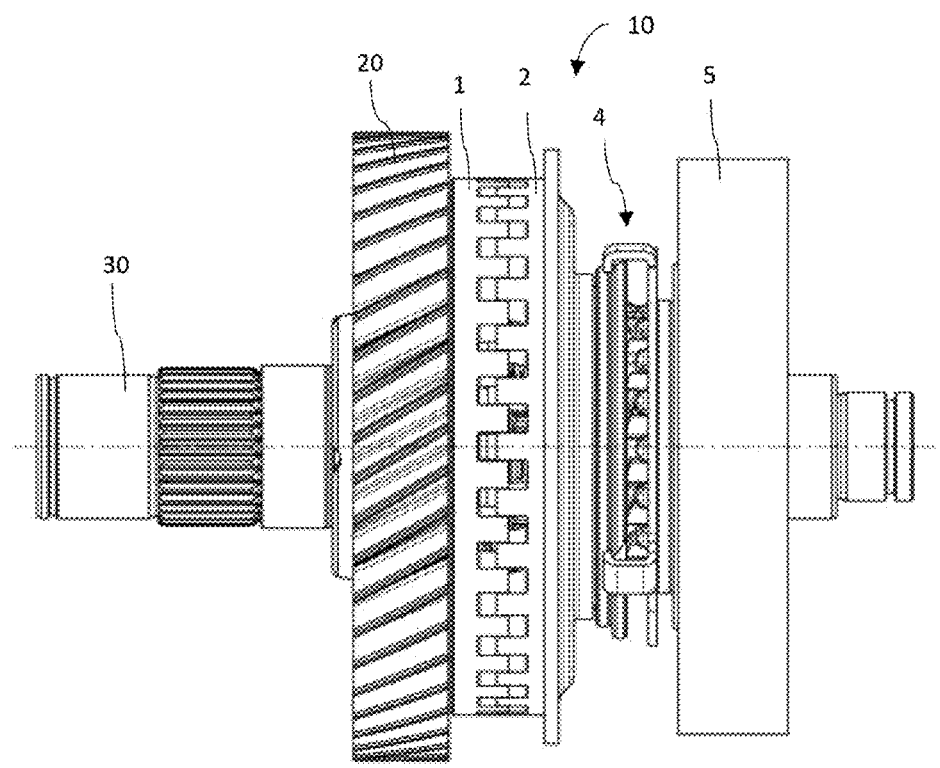
FIG. 1A schematically shows an exemplary embodiment of a disconnect module according to the present invention.

Disconnect module 10
First component 20

End surface 21
Opening 21a
First shaft 30
Drive member 1
Transmission pin 1a
First engagement portion 1b
Clutch member 2
Second engagement portion 2b
Reset assembly 3
Spring 31
First support gasket 32
Second support gasket 33
Protrusion 33a
End surface bearing 34
Cylindrical roller 34a
First support ring 34b
Second support ring 34c
Pressing assembly 4
Pressure plate 41
First protrusion 41a
Inclined groove 41b
First inclined surface A1
Driven plate 42
Second protrusion 42a
Claw 42b
Abutment end B
Guide member 43
First sliding groove 43a
Second sliding groove 43b
First partition portion 43c'
Second partition portion 43c"
Second inclined surface A2
Third inclined surface A3
First support section 43d
Second support section 43e
Third support section 43f
Actuator 5
Action end 5a
Retaining ring 6

DETAILED DESCRIPTION OF THE INVENTION

Reference will now be made in detail to exemplary embodiments and methods of the present invention shown in the accompanying drawings, in which the same reference signs designate the same or corresponding components. However, it should be noted that the present invention in its broader aspects is not limited to specific details, representative devices and methods, and illustrative examples shown and described in connection with the exemplary embodiments and methods.

Unless otherwise defined, the technical or scientific terms used herein shall have the common meanings understood by those skilled in the art. The words "first", "second", and the like used in the description and claims of the patent application disclosed herein do not indicate any order, quantity or importance, being merely used to distinguish different component parts. When the number of components is not specified, the number of components may be one or multiple. Similarly, the words such as "one", "the", "said" and the like do not necessarily indicate a quantity limitation. "Comprise" or "include" or similar words mean that the element or object appearing before the word encompasses the elements or objects and their equivalents listed after the word, without excluding other elements or objects. "Upper", "lower", "left", "right", etc. are only intended to indicate the relative orientation relationship when a device is used or the orientation relationship shown in the accompanying drawings. When the absolute position of the described object changes, the relative positional relationship may also change accordingly. Unless otherwise explicitly described, the terms "connecting", "connected" and the like refer to a relationship in which the structures are fixed or attached to each other directly or indirectly through intermediate structures.

Now refer to the accompanying drawings, in which the same numerals in all of the accompanying drawings represent the same elements.

Figure 1B:
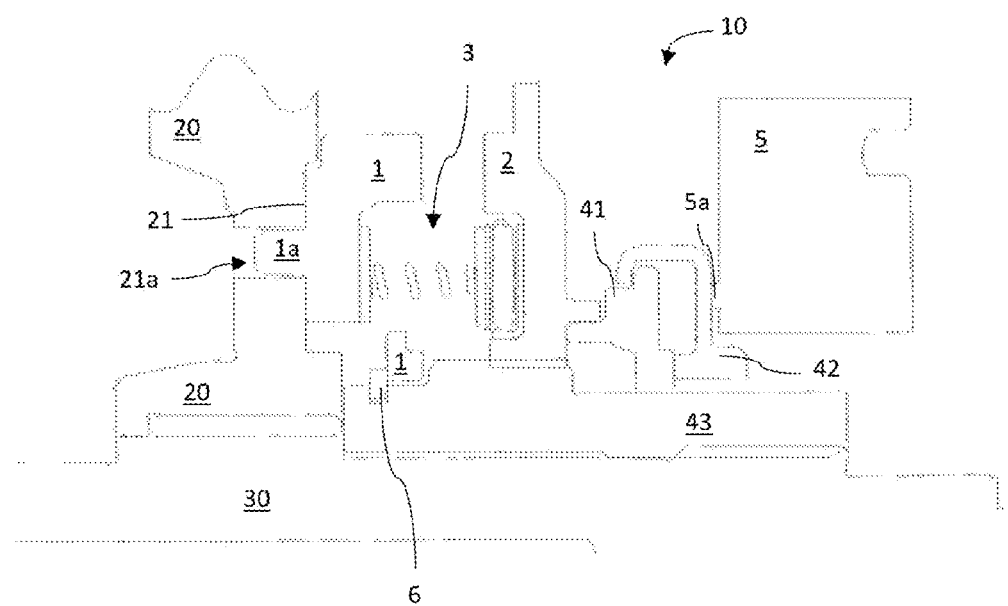
FIG. 1B schematically shows a partial cross-sectional view of the disconnect module of FIG. 1A.

FIG. 1A schematically shows an exemplary embodiment of a disconnect module 10 according to the present invention, and FIG. 1B schematically shows a partial cross-sectional view of the disconnect module 10 of FIG. 1A. Here, the disconnect module 10 is in an engaged state.

The disconnect module 10 of the present invention may be roughly understood with reference to FIGS. 1A and 1B, wherein the disconnect module 10 includes:
 a clutch member 2 rotatably and fixedly mounted on a first shaft 30;
 a drive member 1 axially arranged between a first component 20 and the clutch member 2 and fixedly connected to the first component 20, wherein the clutch member 2 can reciprocate axially to engage with and disengage from the drive member 1, the first shaft 30 rotates together with the first component 20 in an engaged state, and the first shaft 30 is independent of the first component 20 in a disengaged state;
 a reset assembly 3 for applying pressure to the clutch member 2 towards a disengagement direction for disengaging from the drive member 1;
 an actuator 5 including an action end 5a that can reciprocate axially; and
 a pressing assembly 4 configured to connect the action end 5a with the clutch member 2, so that under the pressure applied by the reset assembly 3, one reciprocating movement of the action end 5a can bring the clutch member 2 from the disengaged state to the engaged state and maintain the engaged state until a next reciprocating movement of the action end 5a brings the clutch member 2 from the engaged state to the disengaged state.

In the present invention, the traditional clutch is split into two components, namely, the drive member 1 and the clutch member 2, wherein the drive member 1 is fixedly connected to the first component 20, the reset assembly 3 is arranged on the side of the clutch member 2 facing the drive member 1, and the actuator 5 is arranged on the side of the clutch member 2 away from the drive member 1. The reset assembly 3 and the actuator 5 cooperate with each other on two sides of the clutch member to provide the clutch member 2 with a force to approach or move away from the drive member 1. Also, the pressing assembly 3 is arranged between the clutch member and the actuator 5, so that the clutch member can be in a stable engaged state and a stable disengaged state. That is, it is not necessary to continuously energize the actuator to maintain any of the two states, thereby greatly reducing energy consumption and realizing a bistable disconnect module.

It is noted that "rotatably fixed" described herein means that two components can be connected to rotate together, and their mutual movement in a rotation direction (such as a circumferential direction) is restricted so that they can rotate together. The "rotatably fixed" does not restrict the displacement in a rotation axis direction, so the two rotatably fixed components may have relative displacement in the rotation axis direction. If the displacement in the rotation axis direction is also fixed, it can be considered that the two components are completely fixedly connected.

It is noted here that the first shaft 30 being independent of the first component 20 in the disengaged state means that the motion state of the first shaft 30 is independent of the motion state of the first component 20 at this time. That is, the first shaft 30 and the first component 20 can rotate independently of each other, but it does not mean that there is no connection between them.

In this exemplary embodiment, the clutch member 2 and the first shaft 30 are rotationally fixed by means of a spline connection, and the drive member 1 and the first component 20 are fixedly connected.

Figure 2:
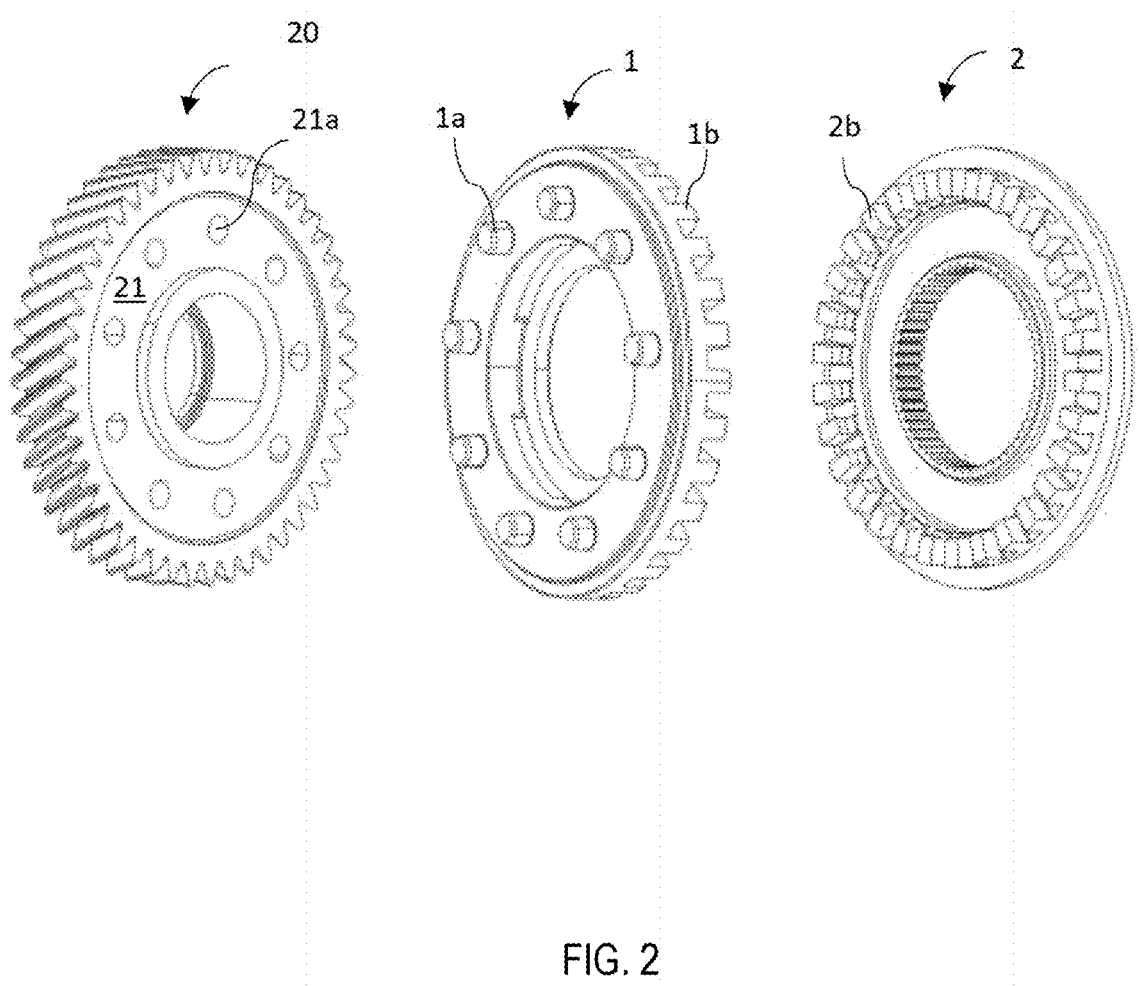
FIG. 2 schematically shows a perspective view of a drive member and a clutch member in FIG. 1A.

FIG. 2 shows a perspective view of the drive member 1 and the clutch member 2 in FIG. 1A. To illustrate the fixed connection manner of the drive member 1, the first component 20 is also shown. The first component 20 is an idler gear in a speed reducer here and has an end surface 21 facing the drive member 1. The drive member 1 is provided with a plurality of transmission pins 1a evenly distributed along a circumferential direction on the side facing the first component 20, a plurality of openings 21a evenly distributed along the circumferential direction are provided on the end surface of the first component 20 facing the drive member 1, and the transmission pins 1a can mesh with the openings 21a so that the drive member 1 is fixedly connected to the first component 20. Other connection manners may also be used within the scope of the present invention to achieve a fixed connection between the drive member 1 and the clutch member 2.

As can be seen from FIG. 2, the drive member 1 has a first engagement portion 1b, the clutch member 2 has a second engagement portion 2b, and the first engagement portion can mesh with the second engagement portion. In this exemplary embodiment, the first engagement portion 1b and the second engagement portion 2b are both configured as end surface teeth.

Referring again to FIG. 1B, in this exemplary embodiment, the pressing assembly 4 includes a guide member 43, a pressure plate 41 and a driven plate 42. As can be seen, the pressure plate 41 and the driven plate 42 are both annular and concentrically mounted on the guide member 43, and the guide member 43 is sleeved on the first shaft 30. The pressure plate 41 abuts against the clutch member 2 on the left side, and the driven plate 42 is used to receive an action force from the action end 5a of the actuator 5 on the right side and transmit the action force to the pressure plate 41.

Figure 3A:
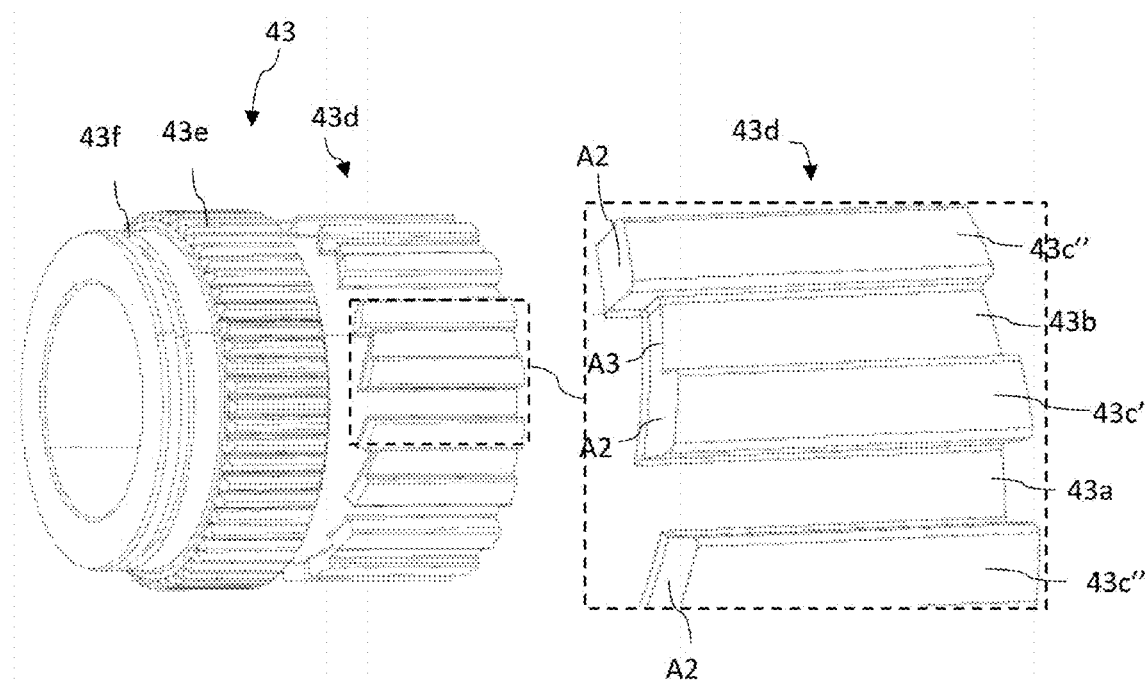
FIG. 3A schematically shows a guide member of a pressing assembly in FIG. 1A.
Figure 3B:
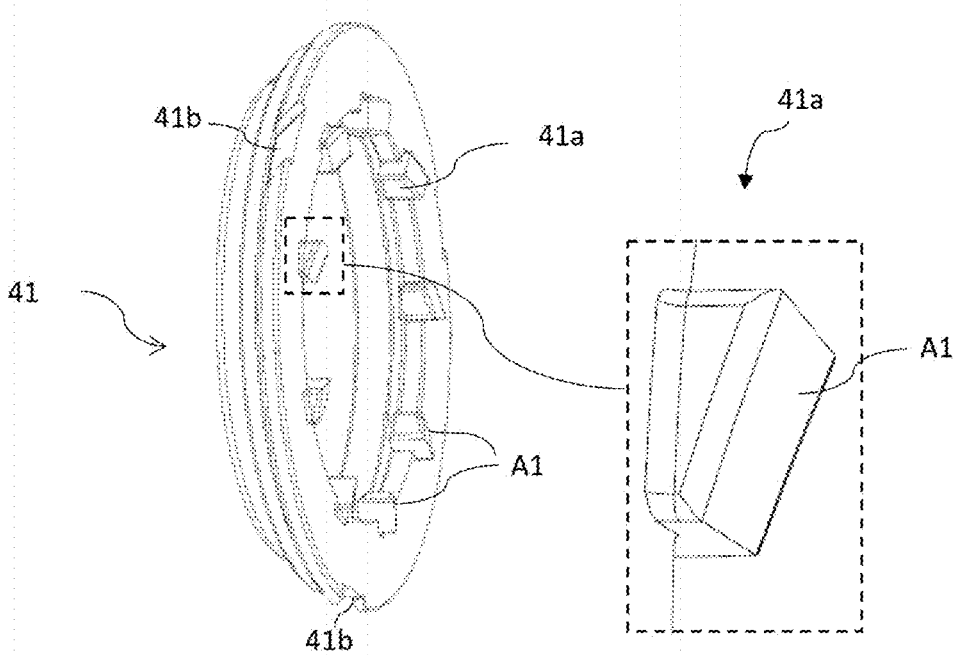
FIG. 3B schematically shows a pressure plate of the pressing assembly in FIG. 1A.
Figure 3C:
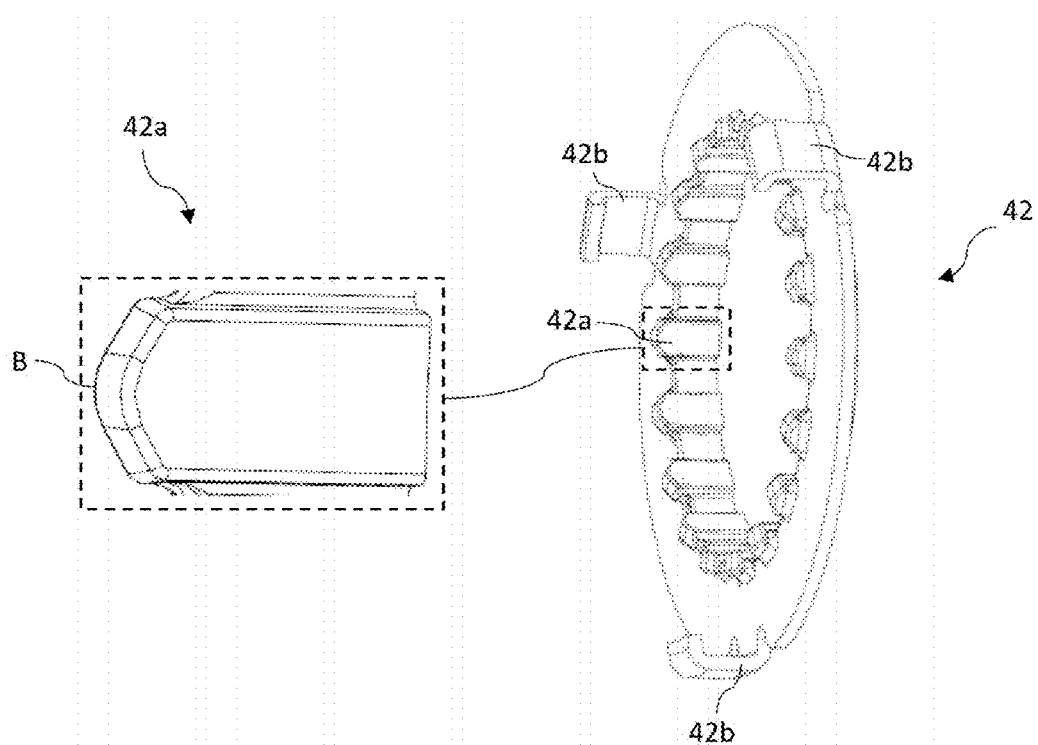
FIG. 3C schematically shows a driven plate of the pressing assembly in FIG. 1A.
Figure 3D:
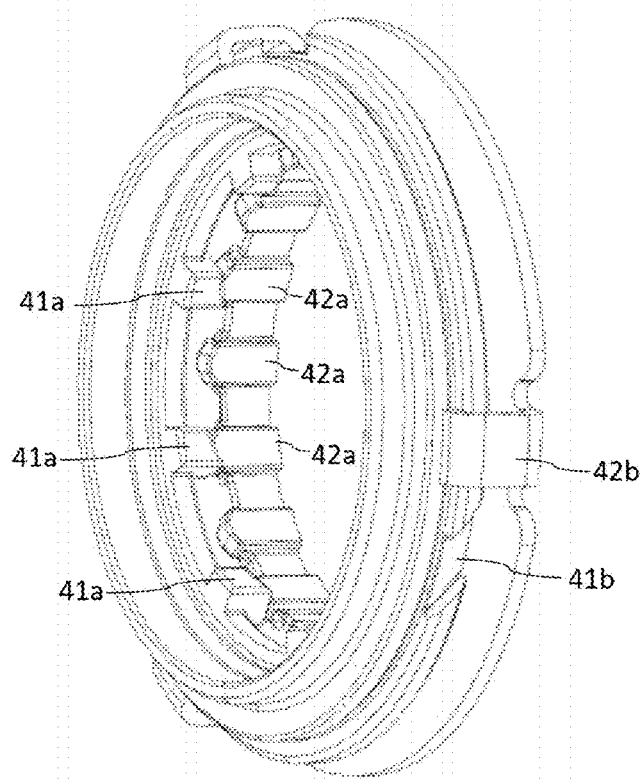
FIG. 3D schematically shows an assembly diagram of the pressure plate in FIG. 3B and the driven plate in FIG. 3C.

FIGS. 3A-3C schematically show the guide member 43, the pressure plate 41 and the driven plate 42 of the pressing assembly 4 in FIG. 1A, respectively. FIG. 3D schematically shows an assembly diagram of the pressure plate 41 and the driven plate 42.

As can be seen from the left figure in FIG. 3A, the guide member 43 has a first support section 43d for radially supporting the driven plate 42, a second support section 43e for rotatably and fixedly supporting the clutch member 2, and a third support section 43f adjacent to the second support section 43e, wherein the second support section 43e is axially spaced from the first support section 43d, thereby allowing the pressure plate 41 to move and rotate axially. With this arrangement, the guide member 43 provides support for both the driven plate 42 and the clutch member 2, and simple assembly can be achieved by providing the integral guide member 43.

It should be noted that the guide member 43 may also not include the second support section 43e and the third support section 43f, so that the support of the driven plate 42 is achieved by a separate member, and the object of the present invention can also be achieved.

A retaining ring 6 (as shown in FIG. 1B) may be provided on the third support section 43f, and the retaining ring 6 is arranged on the side of the drive member 1 close to the first component 20, and has an axial gap with the drive member 1. Thus, the drive member 1 and the guide member 43 are prevented from being axially disengaged during delivery, so that the disconnect module can be provided as an integral assembly, and the retaining ring 6 will not hinder the rotation of the drive member 1 during the operation of the disconnect module 10.

The partial area marked by a dotted frame in the left figure of FIG. 3A is enlarged in the right figure, and the enlarged figure shows that the first support section 43d is provided with a plurality of partition portions 43c', 43c" extending axially and sliding grooves 43a, 43b located between the partition portions. The sliding grooves include first sliding grooves 43a and second sliding grooves 43b having a smaller radial depth than that of the first sliding grooves, and the first sliding grooves 43a are alternately arranged with the second sliding grooves 43b along a circumferential direction. In an exemplary embodiment, the first sliding grooves 43a are set to have the same angular width as the second sliding grooves 43b, and may also be set to have a different angular width from the second sliding grooves 43b, both of which can achieve the object of the present invention.

The guide member 43 is further provided with an end inclined surface, including second inclined surfaces A2 assigned to the partition portion 43c', 43c" and third inclined surfaces A3 assigned to the second sliding grooves 43b, wherein the third inclined surfaces A3 are adjacent to the second inclined surfaces A2 with a smooth transition.

As can be seen from FIG. 3B, the pressure plate 41 is provided with N (here N=9) first protrusions 41a on a radial inner side, the first protrusions 41a are evenly distributed along a circumferential direction, and have first inclined surfaces A1 inclined in the same direction relative to a radial plane, respectively, and the slope of the first inclined surfaces A1 is the same as the slope of the second inclined surfaces A2 of the partition portions 43c', 43c". In addition, these first protrusions 41a have the same angular width as the sliding grooves 43a, 43b. The portion marked with a dotted line frame in the left view is enlarged in the right view. The first inclined surface A1 is more clearly shown in the enlarged view.

As can be seen from FIG. 3C, the driven plate 42 is provided with 2N second protrusions 42a on a radial inner side, and these second protrusions 42a are evenly distributed in a circumferential direction and have the same angular width as the sliding grooves 43a, 43b. The second protrusions 42a are provided with abutting ends B for abutting against the first inclined surfaces A1, respectively. The portion marked with a dotted line frame in the left view is enlarged in the right view. It can be seen from the enlarged view that the abutting end B is set to a tip, so as to form a line contact with the first inclined surface A1 to reduce the friction with the first inclined surface A1. However, the abutting end B may also be designed into other shapes, and the object of the present invention may also be achieved.

The number of sliding grooves 43a, 43b in FIG. 3A is 2N in total, which is consistent with the number of second protrusions 42a shown in FIG. 3C. The sliding grooves 43a, 43b are configured to guide the second protrusions 42a to slide axially. In the disengaged state, the first protrusions 41a can enter the first sliding grooves 43a to slide axially, and in the engaged state, the first protrusions 41a can be stopped on the outside of the second sliding grooves 43b.

In each reciprocating motion of the action end 5a, when the first protrusions 41a are pushed to the outside of the sliding grooves 43a, 43 by the second protrusions 42a, the first protrusions 41a can drive the pressure plate 41 to rotate at certain angles relative to the driven plate 42 under the action force of the action end 5a and the pressure applied by the reset assembly 3. The angles may be the same or different depending on whether the angular widths of the first sliding grooves 43a and the second sliding grooves 43b are the same. When the angular widths of the first sliding grooves 43a and the second sliding grooves 43b are the same, the rotation angles of the pressure plate are the same in two switching processes from the engaged state to the disengaged state and from the disengaged state to the engaged state, with each rotation by 360/2N degrees. When the angular widths of the first sliding grooves 43a and the second sliding grooves 43b are different, the rotation angles of the pressure plate are different in the two switching processes.

Here, the end inclined surfaces A2, A3 of the guide member 43 cooperate with the first inclined surfaces A1 of the pressure plate, so that the first protrusions 41a of the pressure plate can move towards the disengagement direction during each rotation, thereby alternately entering the first sliding grooves 43a and being stopped on the outside of the second sliding grooves 43b.

The partition portion 43c', 43c" of the guide member 43 include first partition portions 43c' located upstream of the second sliding grooves 43b along the rotation direction of the pressure plate 41 and second partition portions 43c" located downstream of the second sliding grooves 43b, and the second partition portions 43c" protrudes axially from the third inclined surfaces A3 of the second sliding grooves 43b. Thus, the first protrusions of the pressure plate can be stopped on the outside of the second sliding grooves 43b when rotating from the first partition portions 43c' toward the second partition portions 43c".

In this exemplary embodiment, the driven plate 42 is provided with a snap mechanism for preventing the driven plate 42 from being axially separated from the pressure plate 41. In another exemplary embodiment, the snap mechanism may also be provided on the pressure plate 41. The object of the present invention can also be achieved.

As can be seen from FIG. 3C, the snap mechanism includes a plurality of claws 42b protruding from the driven plate 42 and capable of being snapped on an edge of the pressure plate 41. An inclined groove 41b extending obliquely to an axial direction is provided on an edge of the pressure plate 41 for mounting the claws 42b and preventing the claws from being disengaged axially.

As can be seen from FIG. 3D, the first inclined surfaces A1 (see FIG. 3B) of the first protrusions 41a of the pressure plate 41 abut against the abutting ends B (see FIG. 3C) of the second protrusions 42a of the driven plate 42. In addition, it can be seen that the claws 42b are snapped on the edge of the pressure plate 41 to prevent the driven plate 42 from being axially separated from the pressure plate 41. The claws 42b may be rotated obliquely into the inclined grooves 41b when mounting and snapped outside the inclined grooves. Due to the design of the inclined grooves, the claws 42b can be prevented from being axially disengaged during use.

In another exemplary embodiment, as an alternative to the inclined grooves 41b, circumferential ridges may be provided on the edge of the pressure plate 41, so that the claws 42b can be mounted on the circumferential ridges by radial elastic deformation, but are not easily disengaged axially after mounting. The object of the present invention can also be achieved.

In this exemplary embodiment, for example, with reference to FIGS. 1B and 3A-3D, it can be seen that the guide member 43 is sleeved on the first shaft 30, the driven plate 42 and the pressure plate 41 are separately sleeved on the guide member 43, and the partition portions 43c', 43c" are protrusions, exactly, protrusions protruding radially outwards. Correspondingly, the first protrusions 41a of the pressure plate 41 and the second protrusions 42a of the driven plate 42 are all protrusions protruding radially inwards.

In another exemplary embodiment, the guide member may also be sleeved on the driven plate. In this case, 2N sliding grooves may be provided in a circumferential wall of the guide member, wherein deeper first sliding grooves may pass through the circumferential wall of the guide member so that they can be seen from the outside of the guide member, whereas shallower second sliding grooves cannot be seen from the outside of the guide member. Correspondingly, the first protrusions of the pressure plate and the second protrusions of the driven plate should be protrusions protruding radially outwards.

Figure 4A:
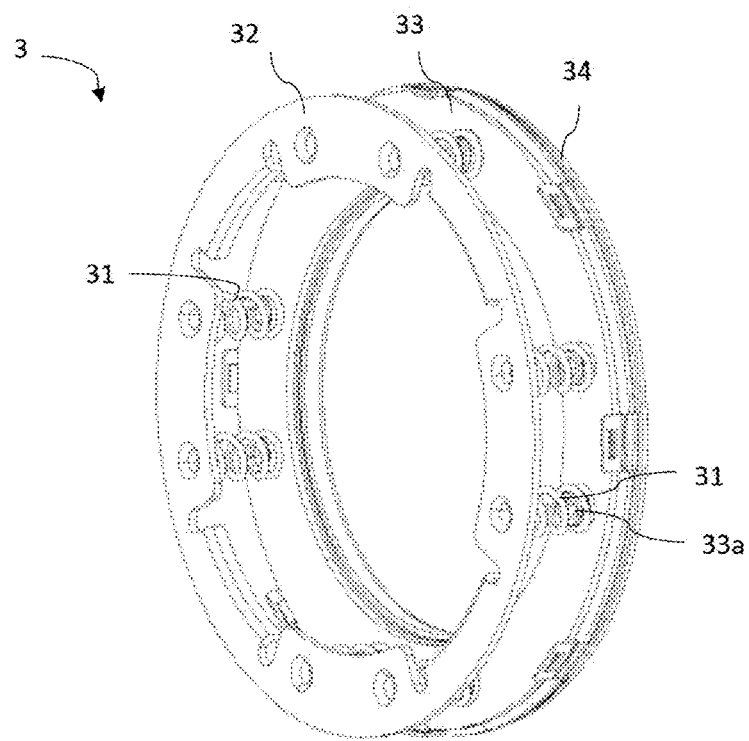
FIG. 4A schematically shows an assembly diagram of a reset assembly in FIG. 1B.

FIG. 4A schematically shows an assembly diagram of the reset assembly 3 in FIG. 1B, wherein it can be seen that the reset assembly 3 includes: a spring 31 acting axially; a first support gasket 32 for abutting against the end of the spring facing away from the clutch member 2; a second support gasket 33 for abutting against the end of the spring facing the clutch member 2; an end surface bearing 34 for axially supporting the spring so that the spring can also maintain acting axially in the disengaged state of the clutch member.

Here, the spring 31 is set as a plurality of spiral springs. In another exemplary embodiment, for example, a Belleville spring may also be used instead of a plurality of spiral springs. In this case, the first support gasket 32 and the second support gasket 33 may be omitted.

In FIG. 4A, the end surface bearing 34 is axially supported between the second support gasket 33 and the clutch member 2. The first support gasket 32 is axially supported on the drive member 1.

In another exemplary embodiment, it can also be contemplated that the first support gasket 32 is axially supported on the first component 20. In another exemplary embodiment, the end surface bearing 34 may also be axially supported between the first support gasket 32 and the drive member 1 or the first component 20.

It can also be seen from FIG. 4A that the second support gasket 33 is provided with a protrusion 33a stamped from one side, and the protrusion is used to support one end of the spring 31. The first support gasket 32 also has the same design here. The support of both ends of the spring 31 is thus achieved effectively at a low cost.

Figure 4B:
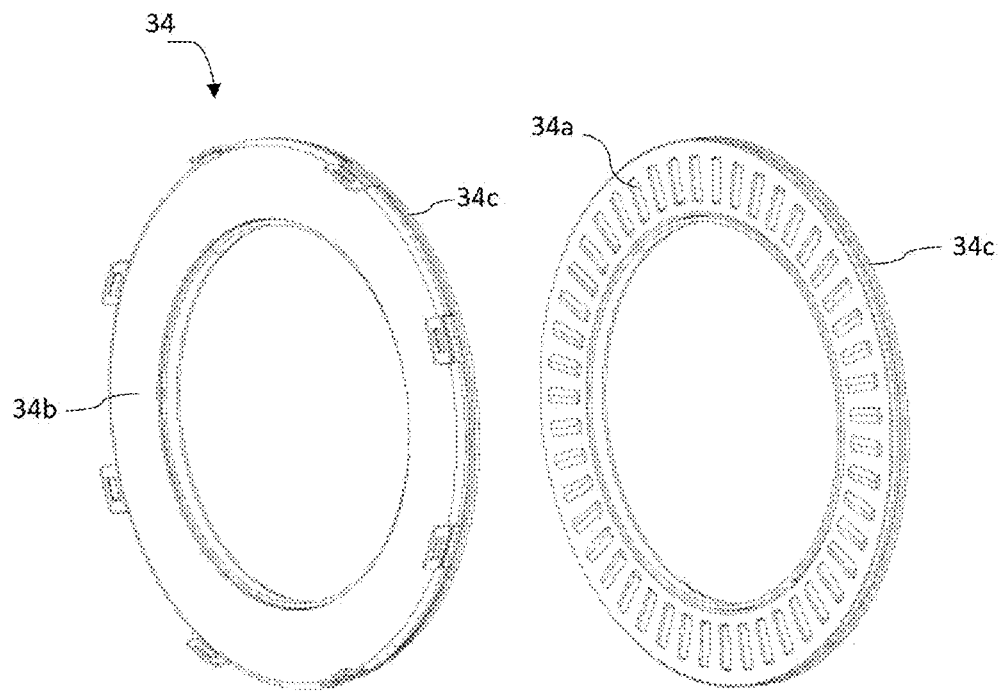
FIG. 4B schematically shows an end surface bearing in FIG. 3A.

FIG. 4B schematically shows the end surface bearing 34 in FIG. 4A. As can be seen from the left figure, the end surface bearing 34 includes a first support ring 34b fixedly connected to the second support gasket 33 and a second support ring 34c fixedly connected to the clutch member 2. The first support ring 34b is removed from the right figure, and a plurality of cylindrical rollers 34a distributed along a circumferential direction are shown.

Figure 5A:
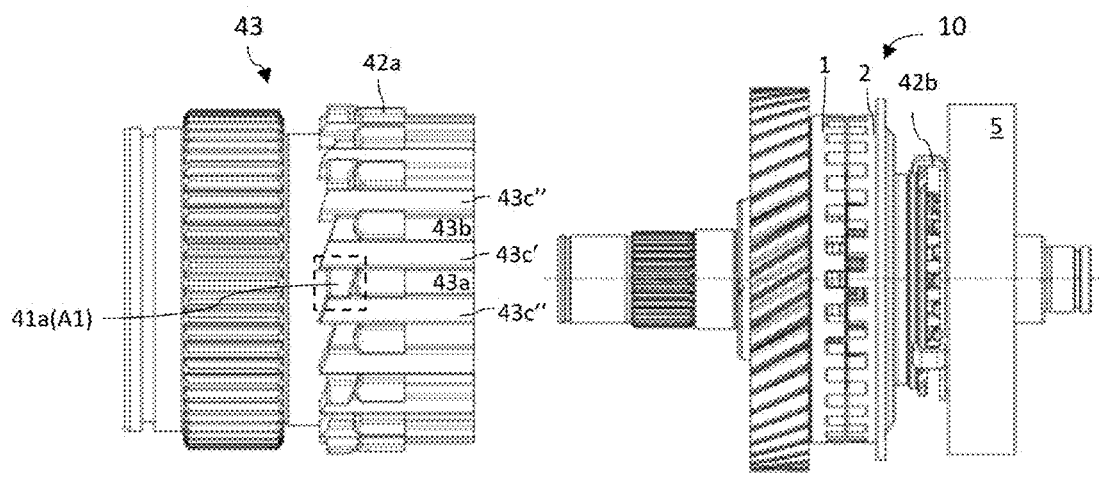
FIG. 5A schematically shows a positional relationship of the pressing assembly when the disconnect module according to the present invention is in a disengaged state.
Figure 5B:
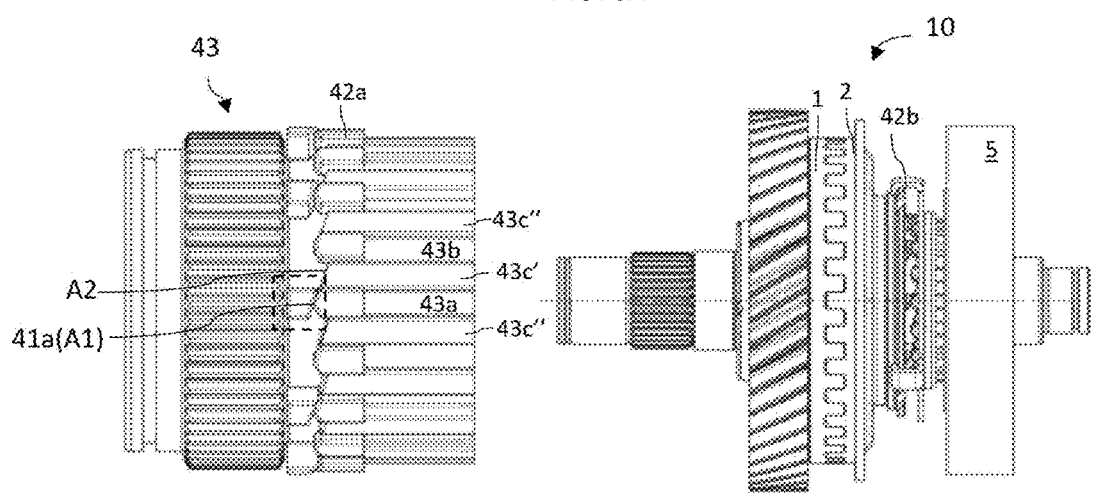
FIG. 5B schematically shows a positional relationship of the pressing assembly when the disconnect module according to the present invention switches from the disengaged state to an engaged state.
Figure 5C:
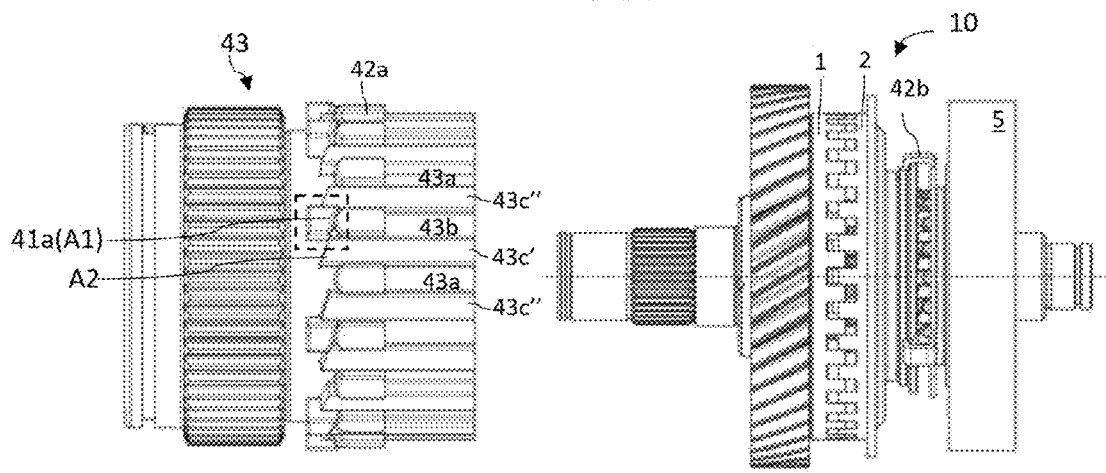
FIG. 5C schematically shows a positional relationship of the pressing assembly when the disconnect module according to the present invention is in the engaged state.

FIGS. 5A-5C schematically show positional relationships of the pressing assembly 4 when the disconnect module 10 according to the present invention is in the disengaged state, when the disconnect module is switched from the disengaged state to the engaged state, and when the disconnect module is in the engaged state, respectively. For clarity, only the positions of the first protrusions 41a of the pressure plate 41 and the second protrusions 42a of the driven plate 42 on the guide member 43 are shown. Here, the first protrusion 41a marked with a dotted line frame is used as an example to illustrate the working process of the pressing assembly 4.

In the disengaged state shown in FIG. 5A, the first protrusions 41a of the pressure plate 41 and the second protrusions 42a of the driven plate 42 all enter the deeper first sliding grooves 43a (see the left figure). At this time, the actuator 5 is powered off, and the action end 5a (which cannot be seen here) is retracted, so it does not abut against the driven plate 42. The driven plate 42 is prevented from being separated from the pressure plate 41 by the claws 42b being snapped on the edge of the pressure plate 41 (see the right figure). At this time, the drive member 1 and the clutch member 2 are disengaged. Therefore, the disconnect module 10 is in a stable disengaged state without additional energy consumption.

When the disconnect module 10 needs to switch from the disengaged state to the engaged state, referring to FIG. 5B, the actuator 5 is powered on, and the action end 5a is pushed to the left, prompting the second protrusions 42a of the driven plate 42 to push the first protrusions 41a of the pressure plate 41 to move leftwards. When the second protrusions 42a push the first protrusions 41a out of the first sliding grooves 43a, the first protrusions 41a are no longer constrained by the first sliding grooves 43a, and the pressure plate 41 can rotate upwards relative to the driven plate 42, and the first inclined surfaces A1 of the first protrusions 41a overlap the inclined surfaces A2 of the first partition portions 43c' above the first sliding grooves 43a. At this time, the first protrusions 41a rotate upwards and slide rightwards under the pressure applied by the reset assembly 3.

During this period, the actuator 5 is powered off, and the action end 5a retracts rightwards. Since the pressure plate 41 and the driven plate 42 are connected together by a snap mechanism, the rightward sliding of the first protrusions 41a is transmitted to the second protrusions 42a. The first protrusions 41a slide through the inclined surfaces A2 of the first partition portions 43c' and continue to slide to the third inclined surfaces A3 assigned to the second sliding grooves 43b. As shown in FIG. 5C, since the second partition portions 43c" downstream of the second sliding grooves 43b protrude axially from the third inclined surfaces A3 of the second sliding grooves 43b, the first protrusions 41a are stopped on the outside of the second sliding grooves 43b. At this time, the drive member 1 and the clutch member 2 are engaged. Therefore, the disconnect module 10 is in a stable engaged state without additional energy consumption.

Therefore, in one reciprocating motion of the action end 5a, the marked first protrusion 41a moves from the first sliding groove 43a of FIG. 5A (stable disengaged state) to the outside of the second sliding groove 43b of FIG. 5C (stable engaged state). The pressure plate 41 rotates at an angle of 360°/2N relative to the driven plate 42.

Accordingly, in the next reciprocating motion of the action end 5a, the marked first protrusion 41a will move from the outside of the second sliding groove 43b of FIG. 5C (stable engaged state) to the first sliding groove 43a downstream (i.e., above the plane of the figure) of the second partition portion 43c" (stable disengaged state), and the pressure plate 41 also rotates at an angle of 360°/2N relative to the driven plate 42.

It can thus be seen that the disconnect module 10 of the present invention can provide two stable states without consuming additional energy to maintain the current state, thereby reducing energy consumption.

The power transmission system provided by the present invention includes: a motor (not shown) having a drive shaft; a speed reducer (not shown) having at least one transmission shaft; and a disconnect module 10, wherein the first shaft 30 shown includes the drive shaft and the at least one transmission shaft. The first component 20 is a gear supported on the first shaft. The actuator 5 may be fixed to the housing of the speed reducer.

It should be understood that the power transmission system refers to a device that is driven by electric power. Illustratively, the motor, as a drive mechanism, may convert input electrical energy into rotational mechanical energy, and the speed reducer is mechanically connected to the motor, so that the torque and rotational speed generated by the motor are adjusted and further transmitted to the wheels of the vehicle.

At least one transmission shaft of the speed reducer may include a speed reducer input shaft and an intermediate shaft arranged parallel to each other. The speed reducer input shaft may be provided with an input gear. The input gear may be integrally formed on the speed reducer input shaft and coaxially arranged with the speed reducer input shaft. The intermediate shaft may be provided with an intermediate first gear and an intermediate second gear. The intermediate first gear is drivingly meshed with the input gear. The intermediate second gear may be drivingly meshed with the driven gear connected to the differential. Thus, a two-stage helical gear parallel shaft speed reducer arrangement from the speed reducer input shaft to the differential is realized.

The operation mode of the disconnect module 10 of the present invention in the power transmission system is as follows: One reciprocating movement of the action end 5a brings the disconnect module 10 into a stable engaged state. In the engaged state, the driving force/torque from the motor can be transmitted to the differential and the wheels connected thereto via the first shaft 30, until the next reciprocating movement of the action end 5a switches the disconnect module 10 from the engaged state to a stable disengaged state. In the disengaged state, the transmission of driving force/torque is disconnected, and even if the wheel still drives the auxiliary drive differential to operate, the rotation of the wheel drives as few transmission mechanisms as possible, thereby reducing drag losses.

A vehicle provided by the present invention includes the power transmission system as described previously. The vehicle may be an electrified vehicle, such as a battery electric vehicle (BEV), a hybrid electric vehicle (HEV), a plug-in hybrid electric vehicle (PHEV) or a range-extended electrified vehicle (REEV). The vehicle may also be a hydrogen-powered vehicle. It should be understood that the vehicle of the present invention also has the advantages described above with respect to the disconnect module and the power transmission system.

Although exemplary embodiments are described in the foregoing description, it should be noted that a large number of variants are possible. In addition, it should be noted that the exemplary embodiments are merely examples and should not be considered as any form of limitation on the scope of protection, applicability, and device construction according to the exemplary embodiments. More precisely, the summary and the description of embodiments are to provide professionals with guidance for implementing at least one exemplary embodiment, wherein various modifications can be made in terms of the function and layout of the assembly, as long as they do not deviate from the scope of protection determined by the claims and equivalent feature combinations.

What is claimed is:

1. A disconnect module for engaging or disengaging a first component rotatable about a first shaft with or from a first shaft, wherein the disconnect module comprises:
a clutch member rotatably and fixedly mounted on the first shaft;
a drive member axially arranged between the first component and the clutch member and fixedly connected to the first component, wherein the clutch member is capable of reciprocating axially to engage with and disengage from the drive member, the first shaft rotates together with the first component in an engaged state, and the first shaft is independent of the first component in a disengaged state;
a reset assembly for applying pressure to the clutch member towards a disengagement direction for disengaging from the drive member;
an actuator comprising an action end capable of reciprocating axially; and
a pressing assembly configured to connect the action end with the clutch member, so that under the pressure applied by the reset assembly, one reciprocating movement of the action end is capable of bringing the clutch member from the disengaged state to the engaged state and maintaining the engaged state until a next reciprocating movement of the action end brings the clutch member from the engaged state to the disengaged state.

2. The disconnect module according to claim 1, wherein the pressing assembly comprises:
a pressure plate axially abutting against the clutch member and provided with N first protrusions;
a driven plate for receiving an action force from the action end and provided with 2N second protrusions; and
a guide member including a first support section radially supporting the driven plate, wherein 2N sliding grooves extending axially are provided in the first support section, the sliding grooves are configured to guide the second protrusions to slide axially, and comprise first sliding grooves and second slide grooves having a radial depth smaller than that of the first sliding grooves, and the first sliding grooves are arranged alternately with the second sliding grooves along a circumferential direction,
wherein in the disengaged state, the first protrusions is capable of entering the first sliding grooves to slide axially, and in the engaged state, the first protrusions is capable of being stopped on the outside of the second sliding grooves.

3. The disconnect module according to claim 2, wherein the first protrusions include first inclined surfaces inclined in the same direction relative to a radial plane, respectively, and the second protrusions include abutting ends for abutting against the first inclined surfaces, respectively; in each reciprocating movement of the action end, when the first protrusions are pushed to the outside of the sliding grooves by the second protrusions, the first protrusions is capable of driving the pressure plate to rotate relative to the driven plate by a certain angle each time under the action force of the action end and the pressure applied by the reset assembly;
the guide member is further provided with end inclined surfaces cooperating with the first inclined surfaces of the pressure plate, so that the first protrusions of the pressure plate is capable of moving towards the disengagement direction during each rotation, thereby alternately entering the first sliding grooves and being stopped on the outside of the second sliding grooves.

4. The disconnect module according to claim 3, wherein the guide member is provided with partition portions located between the first sliding grooves and the second sliding grooves, and the end inclined surfaces comprise second inclined surfaces assigned to the partition portions and third inclined surfaces assigned to the second sliding grooves, the third inclined surfaces are adjacent to the second inclined surfaces with a smooth transition.

5. The disconnect module according to claim 4, wherein the partition portions comprise first partition portions located upstream of the second sliding grooves along a rotation direction of the pressure plate and second partition portions located downstream of the second sliding groove, and the second partition portions protrude axially from the third inclined surfaces of the second sliding grooves.

6. The disconnect module according to claim 2, wherein the driven plate and/or the pressure plate are/is provided with a snap mechanism for preventing the driven plate from being axially separated from the pressure plate.

7. The disconnect module according to claim 6, wherein the snap mechanism comprises a plurality of claws protruding from one of the driven plate and the pressure plate and capable of being snapped onto an edge of the other of the driven plate and the pressure plate.

8. The disconnect module according to claim 7, wherein the edge is provided with an inclined groove extending obliquely to an axial direction, which is used to mount the claws and prevent the claws from being disengaged axially.

9. The disconnect module according to claim 2, wherein the guide member is sleeved on the first shaft, and the driven plate and the pressure plate are separately sleeved on the guide member.

10. The disconnect module according to claim 9, wherein the partition portions are protrusions.

11. The disconnect module according to claim 2, wherein the guide member further has a second support section for rotationally and fixedly supporting the clutch member, and the second support section is axially spaced apart from the first support section.

12. The disconnect module according to claim 11, wherein
the guide member further includes a third support section adjacent to the second support section, the disconnect module comprises a retaining ring provided on the third support section, and the retaining ring is arranged on a side of the drive member close to the first component and includes an axial gap with the drive member.

13. The disconnect module according to claim 1, wherein the reset assembly comprises:
a spring acting axially; and
an end surface bearing for axially supporting the spring, so that the spring can also maintain acting axially when the clutch member is in the disengaged state.

14. The disconnect module according to claim 13, wherein the reset assembly further comprises:
a first support gasket for abutting against an end of the spring facing away from the clutch member; and
a second support gasket for abutting against an end of the spring facing the clutch member,
wherein the end surface bearing is axially supported between the second support gasket and the clutch member or axially supported between the first support gasket and the drive member or the first component.

15. The disconnect module according to claim 14, wherein
the second support gasket is provided with a protrusion stamped from one side, and the protrusion is used to support one end of the spring.

16. The disconnect module according to claim 14, wherein
the end surface bearing comprises a first support ring fixedly connected to the second support gasket and a second support ring fixedly connected to the clutch member.

17. The disconnect module according to claim 1, wherein
the first component is an idler gear in a speed reducer, and the drive member is fixedly connected to an end surface of the idler gear.

18. A power transmission system for a vehicle, comprising:
an electric motor comprising a drive shaft;
a speed reducer comprising at least one transmission shaft; and
the disconnect module according to claim 1, wherein the first shaft comprises the drive shaft or the at least one transmission shaft.

19. A vehicle, comprising the power transmission system according to claim 18.

20. The disconnect module according to claim 3, wherein
the guide member is sleeved on the first shaft, and the driven plate and the pressure plate are separately sleeved on the guide member.

* * * * *